United States Patent
Lee et al.

(10) Patent No.: US 10,274,602 B2
(45) Date of Patent: Apr. 30, 2019

(54) TOMOGRAPHIC LOSS FACTOR ESTIMATION

(71) Applicant: iPosi, Inc., Denver, CO (US)

(72) Inventors: Richard M. Lee, Denver, CO (US); Christopher Neil Kurby, Streamwood, IL (US); Eric Derbez, Vancouver (CA)

(73) Assignee: iPosi, Inc., Denver, CO (US)

( * ) Notice: Subject to any disclaimer, the term of this patent is extended or adjusted under 35 U.S.C. 154(b) by 764 days.

(21) Appl. No.: 14/798,611

(22) Filed: Jul. 14, 2015

(65) Prior Publication Data

US 2018/0074204 A1    Mar. 15, 2018

Related U.S. Application Data

(60) Provisional application No. 62/024,195, filed on Jul. 14, 2014.

(51) Int. Cl.

| | |
|---|---|
| *G01S 19/21* | (2010.01) |
| *G01S 19/22* | (2010.01) |
| *H04B 1/7113* | (2011.01) |
| *H04B 17/10* | (2015.01) |
| *H04B 17/23* | (2015.01) |

(Continued)

(52) U.S. Cl.
CPC .............. *G01S 19/21* (2013.01); *G01S 19/22* (2013.01); *H04B 1/7113* (2013.01); *H04B 17/104* (2015.01); *G01S 19/42* (2013.01); *H04B 17/23* (2015.01); *H04B 17/26* (2015.01); *H04B 17/27* (2015.01); *H04B 17/318* (2015.01); *H04B 17/382* (2015.01); *H04B 17/391* (2015.01); *H04B 2001/70724* (2013.01); *H04B 2201/709718* (2013.01)

(58) Field of Classification Search
CPC ........ G01S 19/21; G01S 19/22; H04B 17/391; H04B 17/318; H04B 17/336; H04B 1/7113
USPC ......................... 342/357.59, 357.61
See application file for complete search history.

(56) References Cited

U.S. PATENT DOCUMENTS

| | | | | |
|---|---|---|---|---|
| 6,289,203 B1 * | 9/2001 | Smith | ............... | H04W 16/18 455/423 |
| 6,978,151 B2 * | 12/2005 | Choi | ............... | H04W 52/10 370/252 |

(Continued)

FOREIGN PATENT DOCUMENTS

| | | |
|---|---|---|
| CN | 103745489 | 4/2014 |
| EP | 1589776 | 10/2005 |

*Primary Examiner* — Chuong P Nguyen
(74) *Attorney, Agent, or Firm* — Marsh Fischmann & Breyfogle LLP

(57) ABSTRACT

Determination of a signal loss profile relative to a receiver based on measured signal power of a sounding signal from a sounding transmitter having a known signal power in free space relative to the receiver. The signal loss profile may include a plurality of signal loss values corresponding to a plurality of received sounding signals at the receiver. In an embodiment, the sounding signal may comprise a GNSS navigational signal (e.g., a GPS signal). The signal loss profile may be used to extrapolate signal loss for a transmitter collocated with the receiver. In turn, the signal loss profile may be used in conjunction with a shared spectrum system to model a signal propagation from the collocated transmitter when determining allocation of a shared spectrum resource of the shared spectrum system.

34 Claims, 7 Drawing Sheets

(51) Int. Cl.
  *H04B 17/26*    (2015.01)
  *H04B 17/318*   (2015.01)
  *H04B 17/382*   (2015.01)
  *H04B 17/27*    (2015.01)
  *H04B 17/391*   (2015.01)
  *G01S 19/42*    (2010.01)
  *H04B 1/707*    (2011.01)

(56) References Cited

U.S. PATENT DOCUMENTS

| | | | | |
|---|---|---|---|---|
| 7,359,727 | B2 * | 4/2008 | Tsien | H04W 52/243 |
| | | | | 370/208 |
| 7,363,049 | B2 * | 4/2008 | Shin | H04W 52/08 |
| | | | | 370/318 |
| 7,660,591 | B1 * | 2/2010 | Krishnakumar | G01S 5/0252 |
| | | | | 342/360 |
| 7,672,282 | B1 * | 3/2010 | Chhabra | H04W 48/20 |
| | | | | 370/318 |
| 8,314,736 | B2 * | 11/2012 | Moshfeghi | H04W 4/029 |
| | | | | 342/465 |
| 8,320,264 | B2 * | 11/2012 | Arpee | H04L 25/0214 |
| | | | | 370/252 |
| 8,750,269 | B2 * | 6/2014 | Lee | H04W 52/242 |
| | | | | 370/338 |
| 9,008,695 | B2 * | 4/2015 | Do | G01S 5/0252 |
| | | | | 455/456.3 |
| 9,319,157 | B2 * | 4/2016 | Alexander | H04B 17/309 |
| 9,386,537 | B2 * | 7/2016 | Muraoka | H04W 16/14 |
| 9,661,581 | B2 * | 5/2017 | Soldati | H04W 52/241 |
| 2002/0168993 | A1 | 11/2002 | Sunghyun et al. | |
| 2004/0137912 | A1 * | 7/2004 | Lin | H04W 64/00 |
| | | | | 455/456.1 |
| 2005/0124354 | A1 | 6/2005 | Durgin | |
| 2008/0160993 | A1 | 7/2008 | Levin et al. | |
| 2012/0256792 | A1 | 10/2012 | Garin | |
| 2014/0194145 | A1 | 7/2014 | Do | |
| 2016/0003949 | A1 * | 1/2016 | Venkataraman | G01S 19/22 |
| | | | | 342/357.29 |

* cited by examiner

TOMOGRAPHIC LOSS FACTOR ESTIMATION

CROSS-REFERENCE TO RELATED APPLICATION

This application claims priority benefit from U.S. Provisional Application No. 62/024,195 filed on Jul. 14, 2014, entitled "TOMOGRAPHIC LOSS FACTOR ESTIMATION," the contents of which are incorporated by reference herein as if set forth in full.

BACKGROUND

In the field of wireless communication, power loss of radiofrequency (RF) signals due to attenuation of signals by structures and/or multipath losses is well-documented. However, accurately determining the power loss of a transmitted RF signal may be difficult due to a number of environmental variables that are difficult to model and/or estimate. In turn, in the event RF signal propagation must be modeled, often free space estimates of the radio signal propagation are utilized. In this regard, specific attenuation or loss patterns with respect to the RF signal may be ignored and free space estimates of the propagation of the RF signal in the absence of attenuation or power loss of the signal may be utilized. However, such approximations may be inaccurate and lead to inefficient or unsatisfactory results where the power loss of the radio signal is affected by the environment through which the RF signal propagates.

SUMMARY

The present disclosure generally relates to generating estimates of RF signal loss that are derived from and/or based on measured RF signal losses of an environment in which a receiver is disposed. Specifically, the present disclosure facilitates generation of accurate RF signal loss estimates for RF communications relative to a transmitter, receiver, and/or transceiver (any of which may be individually or collectively referred to as a radio station) that is located within a building or other structure that affects the propagation of the RF signal originating from or received at the radio station. In turn, the loss estimates may be utilized to generate an attenuation profile, especially for indoor operation, for a stationary in-building radio station. The attenuation profile provides information regarding the loss of RF communications relative to the radio station. Such an attenuation profile as part of channel state or status information may be utilized in a number of contexts, which are disused in greater detail below.

One specific context in which a RF loss estimation (i.e., an attenuation profile) may be utilized is in the field of allocation of shared spectrum resources. Today, widely coordinated shared spectrum systems among private or public spectrum rights holders have, for the most part, been contemplated, but not implemented. Shared spectrum systems may generally be defined as coordinated transmitters, receivers, and/or transceivers (i.e., coordinated radio stations) that collectively operate to utilize a shared spectrum resource. Oftentimes, the coordination of such spectrum resources is centrally controlled by a shared spectrum controller. Development of shared spectrum systems is ongoing with public and private regulations governing such systems being proposed. In any regard, the utilization of shared spectrum systems is only expected to increase with the availability of so-called TV whitespace (TVWS). TV whitespace is a newly accessible spectrum resource that became available along with the transition of television broadcasts from analog television signals to digital television signals. This transition provides for newly accessible resources in the spectrum that may be utilized by shared spectrum systems.

The implementation of shared spectrum systems that utilize shared spectrum resources may account for a number of considerations regarding proposed use of a shared resource by a radio station. For example, a number of legacy services (e.g., licensed spectrum use such as licensed broadcasters, radar installations, or other high priority spectrum uses that must be free from radio interference by other spectrum users) may be considered when developing a shared spectrum system. Given the potential importance of such legacy services, newly added stations (e.g., through licensure, provision of rights, or other authorization to utilize the spectrum) in the shared spectrum system may be governed by the shared spectrum controller. Specifically, the shared spectrum controller may approve, allocate, assign, or otherwise coordinate one or more radio configuration parameters for radio stations within the shared spectrum system that including, for example, carrier frequency, bandwidth, directional antenna configuration, station transmitter power parameters, or other radio configuration parameters. Specifically, a shared spectrum controller may coordinate radio stations in the shared spectrum system in view of a priority of users in the system (e.g., with prior higher priority given to existing users and/or legacy services). Furthermore, the shared spectrum controller may coordinate incumbent users such that utilization of the spectrum may be optimized.

Accordingly, the coordination of such shared spectrum systems generally include coordination based on logic that uses real-time or expected radio interference conditions between the various components of the shared spectrum system. For example, to enable an additional radio station to participate in the shared resource of the shared spectrum system, new stations must provide accurate location information and other radio configuration parameters to be considered in connection with the addition of the station to the shared spectrum system. To estimate a stable compatibility condition with surrounding devices and legacy services also sharing in the same spectrum resource, the shared spectrum controller may configure additional radio stations based on an assumed path loss based on a free space path loss between the reported location of the newly added radio station and protection boundaries defined by legacy services and any other additional stations that are granted higher protection from lower tier devices within the system. In this regard, the estimated stable compatibility condition may represent a conservative estimation of the actual interference between radio stations within the system because signal losses (e.g., due to a location of a radio station within a building or other structure) may prevent actual propagation of a signal to the extent of the free space estimate. While such conservative estimate of signal propagation may prevent interference between radio stations in the system, such conservative allocation also limits the available spectral resource to be utilized and may create gaps in radio coverage by stations in the system. In this regard, it may be desired to provide a more efficient mechanism for allocation of radio resources that satisfies considerations regarding interference between radio stations in the system, yet allocates radio resources in a more efficient manner.

Accordingly, utilization of an attenuation profile for estimating power loss of a RF signal with respect to a particular receiver may be utilized during the allocation of shared spectrum resources to more efficiently allocate resources to a radio station for utilization in a shared spectrum system. In this regard, use of the attenuation profile may allow interference to be avoided, yet may more efficiently utilize spectrum resources. Other applications for loss estimation of an RF signal relative to a receiver are also contemplated herein. Examples may include, for example, energy audits for structures, structural integrity monitoring, or other applications where it is valuable to understand the RF power losses imparted by a structure within which a receiver is disposed.

The present disclosure generally relates to forming attenuation profiles for a stationary receiver located indoors based on a sounding signal generated exterior to the building or structure in which the receiver is located. Such sounding signals may have a known signal power level relative to the receiver in free space. That is, the sounding signal may have a known power level at the location of the receiver if the signal propagates through free space (i.e. the absence of any materials in the RF path between a sounding transmitter that generates the sounding signal and the receiver). The sounding signal may also be generated at a sounding transmitter at a known location. In this regard, a direction of incidence of the sounding signal may be determined relative to receiver. The direction of incidence may be based on the known location of the sounding transmitter relative to a known location of the receiver. In this regard, upon receipt of the sounding signal at the receiver, the actual power of the received signal may be measured and compared to the known signal power level of the sounding signal relative to the receiver in free space to determine an amount of loss in the form of a signal loss value. The signal loss value may be associated with the direction of incidence of a corresponding sounding signal. In turn, a plurality of sounding signals received from a plurality of directions of incidence may be used to generate a plurality of signal loss values in a number of directions relative to the receiver. In turn, a three-dimensional model or attenuation profile of the attenuation imparted by a structure in which the receiver is located may be generated.

In this regard, it is been further recognized that global navigation satellite system (GNSS) signals such as GPS signals may be particularly useful performing such an attenuation profile. As such, GNSS space vehicles (e.g., GPS satellites that are part of the GPS satellite constellation) may provide at least a first type of space vehicle used as sounding transmitters. In particular, GPS signals are well-suited for lost estimation because the ambient outdoor amplitudes (e.g., the known signal power level of the GPS signals relative to receiver in free space) are well-controlled and known using a globally controlled ground network and master control segment. For GPS, the globally controlled ground network and master control segment is operated by the U.S. Air Force so that signal amplitude is controlled within specific power levels at the surface of the Earth for both civilian and military GPS receivers. In this regard, the power level of such GPS signals relative to the receiver in free space is known. Furthermore, GPS signals contain ephemeris data that may include or be utilized to determine the location of a space vehicle generating the GPS signal. In turn, the location of the sounding transmitter in the form of the GPS space vehicle may be known such that a direction of incidence of the GPS signal relative to the receiver may be resolved.

However, other types of space vehicles may be provided as sounding transmitters. For instance, one or more satellites from the iridium satellite constellation may be operative to provide a sounding signal from a known location relative to a receiver with a known signal loss relative to the receiver in free space. In this regard, one or more iridium satellites or other space vehicles of a type other than a first type (e.g., GPS satellites) may be utilized including, for example communications satellites such as the aforementioned iridium constellation or other communication, research or other type of satellite vehicle. Furthermore, space vehicles of the first and second type may be utilized in conjunction. For instance, one or more of the satellite vehicle types described above may have different signal reception coverages relative to the receiver. That is, the receiver may not be operable to receive signals from a given type of space vehicle from certain directions of incidence given that the space vehicles of the given type do not have orbit characteristics that provide a full range of directions of incidence relative to the receiver. Thus, in at least one embodiment, space vehicles of different types may be utilized to provide a full range of directions of incidences for signals relative to the receiver.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
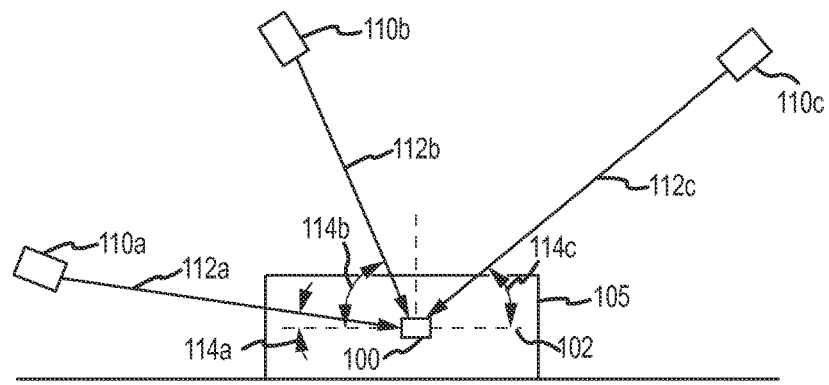
FIG. 1 depicts a schematic embodiment of a receiver located within a structure that receives sounding signals from one or more sounding transmitters at a plurality of locations relative to the receiver.

FIG. 1 depicts a receiver 100 located within a structure 105. For example, the receiver 100 may be an indoor receiver located within a building that includes structure 105 that surrounds the receiver 100. In this regard, the structure 105 may include one or more building materials that may each have an effect (e.g., a corresponding reduction in signal power) on the signal as it passes through the material. Furthermore, various different building materials may be located in different relative positions with respect to the receiver 100 such that different signal loss values may be experienced relative to the receiver 100 depending upon a direction of incidence from which the signal is received at the receiver 100. For instance, a first signal received at the receiver 100 may pass through a glass window prior to being received by the receiver, whereas a second signal received at the receiver 100 may pass through other portions of the structure that include metal, wood, insulation, and/or other building materials. As such, the first signal may undergo a different signal loss than the second signal. In an embodiment, the receiver 100 may be stationary within the structure 105. For instance, the receiver 100 may be relatively permanently disposed within the structure 105. As will be discussed in greater detail below, this may allow sounding signals received over a relatively long duration of time.

FIG. 1 further depicts a plurality of sounding transmitters 110 at different relative positions relative to the receiver 100. Specifically, sounding transmitters 110a, 110b, and 110c are depicted. Each sounding transmitter broadcasts a corresponding sounding signal 112a, 112b, and 112c. In an embodiment, sounding transmitters 100a, 100b, and 100c may each be different transmitters that are each at different locations relative to the receiver. Additionally or alternatively, the transmitters 100a-110c may be a single sounding transmitter 110 that is disposed at three different relative locations with respect to the receiver 100 at three corresponding different times. For example, the sounding transmitter 110 may transmit sounding signal 112a at a first time when in the position depicted by transmitter 110a. The sounding transmitter 110 may then move to a second location depicted as sounding transmitter 110b and broadcast a second sounding signal 112b at a second time. The transmitter 110 may further move to a third location depicted as 110c and broadcast a third sounding signal 112c at a third time. Furthermore, a plurality of different sounding transmitters 110 may each broadcast sounding signals 112 at different times from different locations that are each received by the receiver 100. Preferably, a large number of sounding signals 112 are received at the transmitter from a large number of locations relative to the receiver 100 to provide a robust attenuation profile relative to the receiver 100.

In any regard, the location of the sounding transmitters 110a, 110b, and 110c may be known or determinable. For example, the sounding transmitters 110a-110c may comprise GPS space vehicles that broadcast ephemeris data to the receiver 100. In this regard, the ephemeris data may be utilized by the receiver 100 to determine the location of the GPS space vehicle at the time of the broadcast of the sounding signal 112. Alternatively, any one or more of the sounding transmitters 110a, 110b, and 110c may include aerial vehicles (e.g., unmanned aerial vehicles or "drones") that are moveable relative to the structure 105 and receiver 100 therein. The sounding transmitters 110a, 110b, and 110c may be location aware (e.g., including GPS receivers) that may be used to determine the location of the transmitters 110a-110c at the time a given sounding signal 112 is broadcast.

Additionally, space vehicles (i.e., satellites) of different types may be utilized as sounding transmitters. For instance, GPS satellites may have at least some limitations in orbits relative to the receiver. As such, there may be "blind spots" relative to the receiver from which GPS satellites are incapable of providing a sounding signal. In turn, another type of space vehicle (e.g., from a different satellite constellation such as a communications satellite constellation, research satellite constellation or the like) may be employed in conjunction with space vehicles of the first type (e.g., GPS satellites) to provide a full range of directions of incidence for sounding signals relative to the receiver. In one particular example, the iridium constellation of satellites may be operative to provide a sounding signal form a known location for use in accord with the concepts presented herein.

Furthermore, the signal power level of each of the sounding signals 112a, 112b, and 112c relative to the receiver 100 in free space may be known. By a power level relative to the receiver 100 in free space, it is meant that a signal power level for a signal that propagates only through free space between the transmitter 110 and receiver 100 is known. This may include propagation through space and/or atmospheric layers of the Earth to reach the receiver 100. For example, in the case where the sounding transmitter 110 comprises a GPS space vehicle and the sounding signal 112 is a navigational signal broadcast from the GPS space vehicle, the signal power at the receiver absent any attenuation from sources other than the atmosphere through which the signal propagates may be accurately controlled by the United States Air Force utilizing a global control ground network and master control segments. That is, the signal power of GPS signals at or near the surface of the Earth may be tightly controlled such that the power of the signal absent any external attenuation may be known. Furthermore, in the event the sounding transmitter is an aerial vehicle or the like, a broadcast power level may be controlled such that the power level of the sounding signal 112 at the receiver in free space may be determined.

Figure 5:
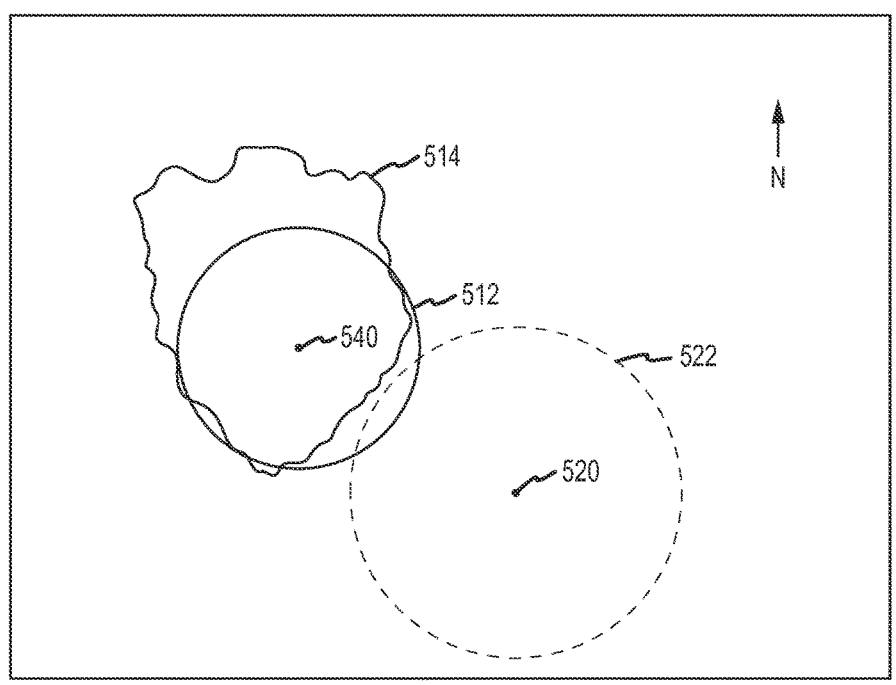
FIG. 5 represents embodiment of use of estimated signal loss values and assigning radio configuration parameters to a radio station and shared spectrum system.
Figure 6:
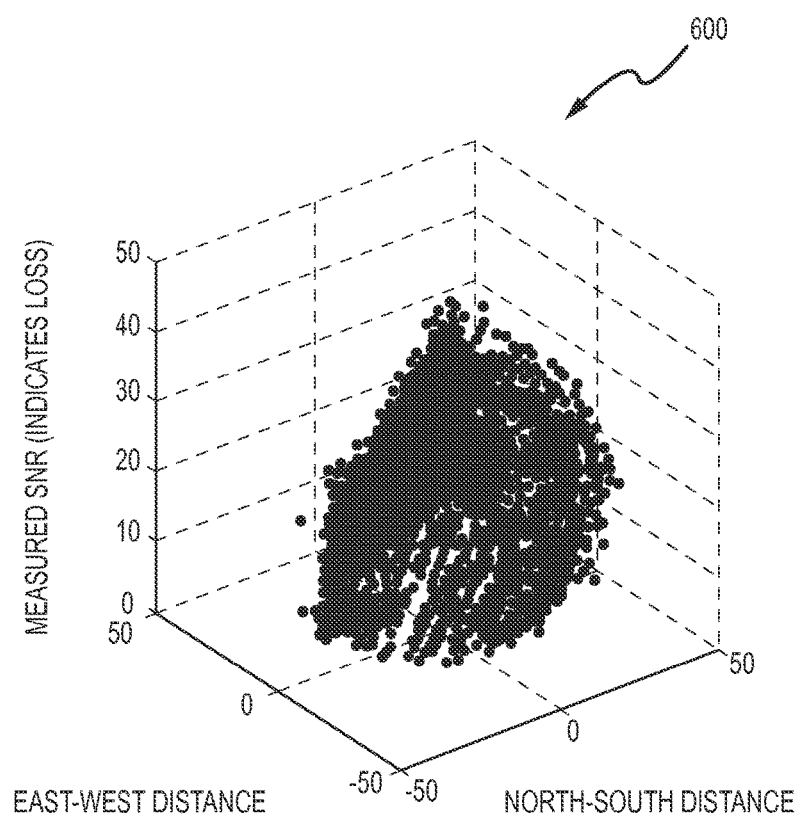
FIG. 6 depicts a plot of measured signal loss values relative to receiver.
Figure 7A:
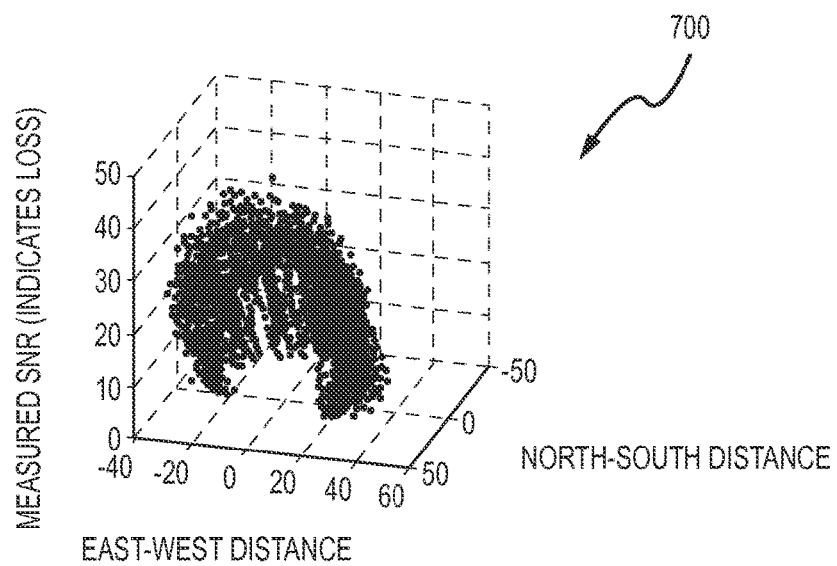
FIG. 7A and 7B depict plots of measured signal loss values relative to receiver and a number of orientations depicting a shape of the signal loss value plot illustrating a balance or directionalized loss relative to the receiver.
Figure 7B:
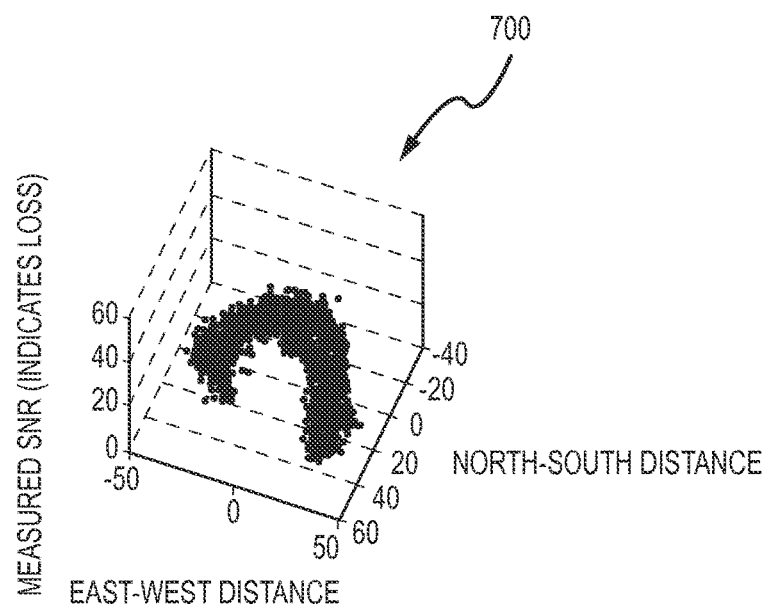

In this regard, upon receipt of the sounding signals 112a-112c at the receiver 100, the power of the sounding signals may be measured as received by the receiver 100. Because the structure 105 may at least in part reduce the power level of the signal received at the receiver 100, the receiver 100 may compare the received power level of each sounding signal 112a-112c to the known signal power level of the sounding signal relative the receiver in free space. The quantified loss of the signal power may be used to generate a signal loss value for each sounding signal 112a-112c. The signal loss value may be a quantified value that describes the amount of attenuation or signal power loss a sounding signal undergoes prior to receipt at the receiver 100. Furthermore, as each sounding signal may be received from a different direction from a different known location of the sounding transmitter 110, a corresponding signal loss value for each sounding signal 112 may be associated with a direction of incidence for the sounding signal 112. For example, sounding signal 112a from sounding transmitter 110a may be used to generate a signal loss value that is associated with a direction of incidence 114a (depicted in FIG. 1 as an angle measured from horizontal to the direction of incidence of the signal 112a). Sounding signal 112b from sounding transmitter 112b may be used to generate a signal loss value that is associated with the direction of incidence 114b. Furthermore, sounding signal 112c from sounding transmitter 110c may be associated with the direction of incidence 114c. It is noted that sounding receiver 110a may be at an elevation relative to the receiver 100 so that the sounding signal 112a passes through a sidewall of the structure 105, while as sounding signals 112b and 112c each pass through a roof of the structure 105. As such, different respective ones of the sounding signals 112 may pass through a different portion of the structure 105, which may result in different attenuations of the signals 112 at the receiver 100. In the two-dimensional representation depicted in FIG. 1, the direction of incidence 114 may comprise a single measure relative to a known coordinate system 102 configured relative to the receiver 100. In the context of a two dimensional representation, the direction of incidence may be described as a direction in relation to a plane disposed relative to the receiver 100. For example, this plane may be oriented generally tangential to the surface of the Earth at the location of the receiver. As such, the two dimensional representation may include a measure of the direction of incidence in the plane (e.g., such as a heading measure relative to the receiver) along with a measure of the attenuation of the signal. This type of representation is shown in, for example, FIG. 5 described in greater detail below. However, as also discussed in greater detail below, the direction of incidence 114 for a given sounding signal 112 may be described relative to a three-dimensional coordinate system. One such example may be a spherical coordinate system where the direction of incidence may include an azimuth measurement (e.g., a heading) and an elevation measurement (e.g., an elevation) measured in degrees relative to the receiver 100. In this example, the radial dimension may represent the amount of attenuation as quantified using any of the approaches described herein. This approach is shown in FIGS. 6, 7A, and 7B discussed in greater detail below. As such, the sounding signals received may be described absolutely relative to the receiver in three dimensions.

As a sounding signal 112 is to be received at the receiver 100, it may be appreciated that techniques to assist in receipt and/or recognition of radiofrequency signals at the receiver 100 may be employed in connection with receiving the sounding signal 112 at the receiver 100. For example, often times signal acquisition may be improved through the use of coherent integration to recognize a signal over a coherent integration interval. Such coherent integration is known in the art and may provide greater sensitivity for low-power signals received at the receiver 100. Furthermore, non-coherent integration techniques whereby signals received over a plurality of coherent integration intervals may be non-coherently summed may also be applied to promote signal sensitivity at the receiver 100. In this regard, a number of signal processing techniques may be employed to assist in improving receiver sensitivity to sounding signals. In turn, sounding signals may be received over relatively long duration that may include at least more than one coherent integration interval for the receiver. Furthermore, techniques described in co-owned U.S. patent application Ser. No. 14/267,629 filed on May 1, 2014 entitled "TAPERED COHERENT INTEGRATION TIME FOR A RECEIVER OF A POSITIONING SYSTEM," the entirety of which is incorporated by reference herein, may be utilized to improve signal sensitivity of the receiver. Additionally, any other known signal processing techniques that may improve receiver sensitivity may be employed without limitation.

Furthermore, it may be appreciated that, in at least one embodiment, the sounding signal 112 may include GNSS navigational signals. Accordingly, known approaches to assisted signal acquisition for navigational signals from a GNSS space vehicle may be employed that may include, for example, receiving almanac data regarding a navigational signal to be received by the receiver to improve and signal acquisition. In this regard, approaches described in co-owned U.S. Pat. No. 7,961,717, the entirety of which is incorporated by reference herein, may be utilized in an assisted GPS technique to improve signal acquisition at the receiver 100. Other appropriate assisted GPS acquisition techniques that may include synchronization and or receipt of almanac and/or ephemeris data at a receiver may be employed. Furthermore, a time spread acquisition technique may be utilized that, as addressed above, may extend across a plurality of coherent integration intervals. In this regard, it may be appreciated that solving for bias of a receiver over the relatively long duration of signal acquisition associated with the time spread acquisition technique may be employed. In this regard, co-owned U.S. patent application Ser. No. 14/285,770 filed May 23, 2014 entitled "JOINT PROCESSING OF GNSS PSEUDORANGE SIGNALS," the entirety of which is incorporated by reference herein, may be employed to facilitate time spread acquisition of GNSS signals over a plurality of coherent integration intervals. In this regard, the time spread acquisition of signals may extend for a relatively long duration such as on the order of seconds, minutes, tens of minutes, hours, days, or even months or more. Other techniques for reduction of bias in signals over a time spread may also be employed that may include, but are not limited to, synchronization of a receiver to a sounding transmitter clock to reduce bias may receive signal.

Figure 2:
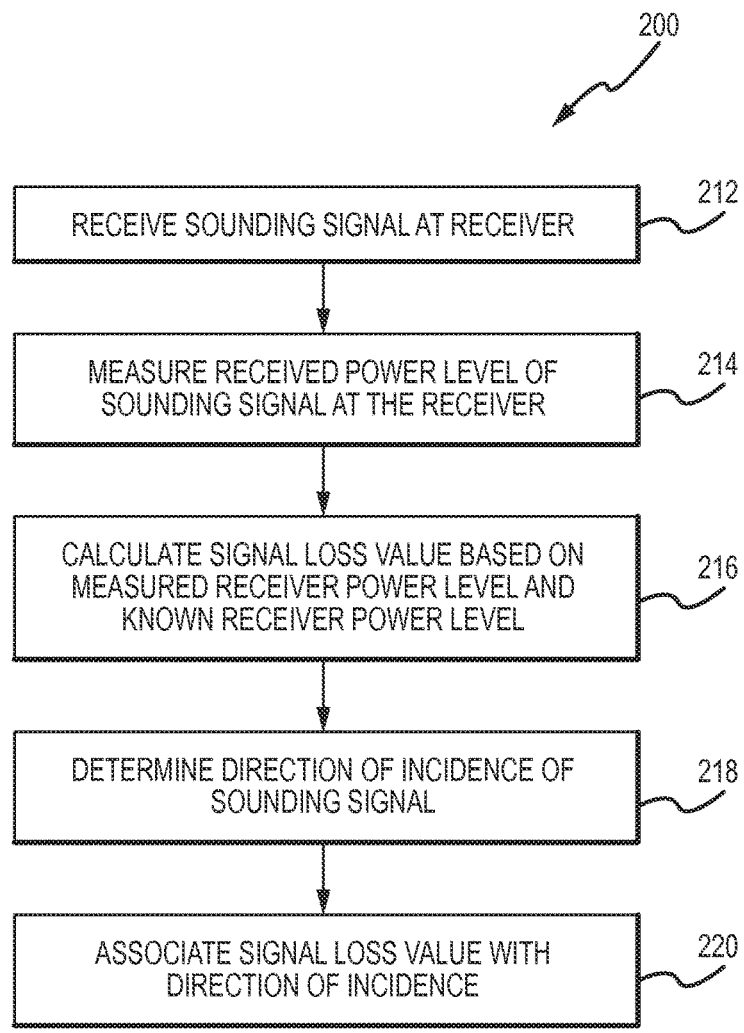
FIG. 2 depicts a flow chart depicting an embodiment of a method for signal loss determination relative to a receiver located within a structure.

With further reference to FIG. 2, a flow chart depicting a method 200 for determining a signal loss value at a receiver 100 is depicted. The method 200 may include receiving 212 a sounding signal at the receiver. As described above, the sounding signal may, in at least one embodiment, be a navigational signal provided via GPS space vehicle or the like. The method 200 may further include measuring 214 the received power level of the sounding signal at the receiver. In turn, the method 200 may include calculating 216 a signal loss value for the sounding signal based on the measured received power level and the known receiver power level of the sounding signal. For example, the signal loss value may be a ratio quantifying the relationship of the measured receiver power level to the known receiver power level to determine a fraction of the power level of the signal received at the receiver within a structure relative to the full power signal that would otherwise presumably be received by the receiver and free space. Alternatively, the signal loss value may comprise a quantitative comparison between carrier to thermal nose power ratios for a measured signal relative to a signal in free space. That is, the signal loss value may comprise a measure derived based on a measured signal to noise ratio (SNR) of a measured signal relative to a known SNR for the sounding signal in free space. Other appropriate values for the signal loss value may be utilized without limitation that quantify the amount of power loss of the signal due to the structure 105 and/or environment surrounding the receiver 100.

The method 200 may further include determining 218 the direction of incidence the sounding signal. The location of the sounding transmitter may be known or determinable. The determining may include resolving a location of the sounding transmitter based on data provided regarding the sounding transmitter. Thus, the location of the sounding transmitter may be used in connection with the location of the receiver to generate the direction of incidence relative to the receiver for the sounding signal from the sounding transmitter. Accordingly, the method 200 may further include associating 220 the signal loss value calculated for the sounding signal with the direction of incidence of the sounding signal.

The method 200 may be performed locally at the receiver 100. Alternatively or additionally, the least a portion of the steps of the method 200 may be performed by remote resources. For example, the receiver 100 may be in operative communication with a remote resource, such as a server, remote processor, or other device known in the art. The communication between the receiver 100 and the remote resource may be by way of networked communication (e.g., over a wide area network such as the internet). In turn, one or more steps of the method 200 may be performed remotely from the receiver. For example, some or all of the measuring 214, calculating 216, determining 218, and/or associating 220 may be performed remotely from the receiver 100.

The method 200 may further be repeated for a plurality of sounding signals. As such, a plurality of signal loss values for a plurality of sounding signals received from a plurality of directions of incidence relative to the receiver may be generated. As such, a signal loss profile for the receiver 100 may be generated for the two-dimensional or three-dimensional space in which the receiver situated within the structure 105. That is, because signal loss may be greater in a particular direction of incidence compared to other directions of incidence, signal loss values are associated with corresponding directions of incidence to create a profile of the signal loss due to the structure 105 surrounding the receiver 100. Accordingly, the signal loss due to the structure 105 surrounding receiver 100 may be determined substantially surrounding the receiver 100. In an embodiment, the signal loss may be described in a signal loss profile that is a two dimensional representation of the loss. That is, a single dimension may be provided that describes a two dimensional ray corresponding to the direction of incidence between the sounding transmitter and the receiver. For instance, an azimuth angle relative to the receiver may be provided that describes the two dimensional direction of incidence (e.g., resulting in a signal loss profile represented entirely in a single two dimensional plane relative to the receiver such as one parallel to the surface of the Earth at the receiver). In an embodiment, the signal loss of the signal loss profile may be a three dimensional representation of the signal loss. As such, the signal loss may be described with two dimensions that fully describes a three dimensional representation of a three dimensional ray corresponding to the direction of incidence between the sounding transmitter and the receiver (e.g., resulting in a signal loss profile represented in a three dimensional space relative to the receiver). For instance, an azimuth angle and an elevation angle may be provided that describes the three dimensional direction of the direction of incidence relative to the receiver.

Figure 3:
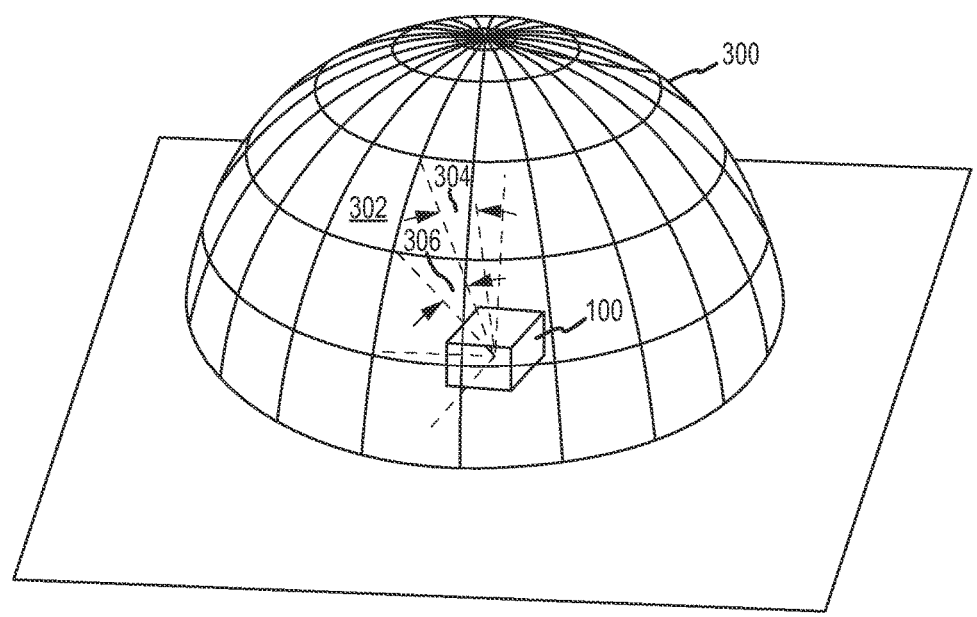
FIG. 3 depicts an embodiment of a coordinate system relative to a receiver for use in generation of an attenuation profile relative to the receiver.

For example, the area surrounding the receiver 100 may be described by spherical coordinate system 300 graphically depicted in FIG. 3. The spherical coordinate system may include measures of an elevation angle and an azimuth angle for a given direction of incidence. The elevation angle may describe an angle of elevation (i.e., deviation from horizontal or vertical relative to the receiver) and the azimuth angle may describe a heading from which the signal is received. In this regard, the area over which signal loss values may be determined for a receiver may include 360° of azimuth range and 180° of elevation range. In this regard, a 360° azimuth range (i.e., 0° to 360°) and a 180° elevation range (i.e., −90° to 90°) may define an entire spherical area surrounding the receiver 100. However as the receiver 100 is likely to be near the surface of the Earth (e.g., even if in a relatively tall office building or the like), receipt of signals from below the receiver 100 (i.e., nearer the Earth) is unlikely. In this regard, the area over which signal loss values are determined may comprise at least a half sphere area relative to the receiver 100 as shown in FIG. 3 by the spherical coordinate system 300 grid (e.g., with 360° of azimuth range and an elevation range of 0° to 90°). In the case of a GPS satellite comprising the sounding transmitter 110, one or more such GPS satellites may provide a relatively large number of sounding signals over a period of time to the receiver 100 such that signal loss values may be generated relative to the receiver throughout a majority of the spherical coordinate system 300 extending in a the area relative to the receiver 100.

The spherical coordinate system 300 shown in FIG. 3 may be divided into "pixels" 302 for use in quantifying the loss profile relative to the receiver 100. Each pixel may be described as a range of azimuth angles 304 and elevation angles 306 relative to the receiver 100. As such, each pixel may comprise an imaginary analytical spherical surface portion relative to the receiver 100. In this regard, a plurality of sounding signals 112 may be received from directions of incidence 114 that fall within the pixel 302 of the spherical coordinate system 300 relative to the receiver 100. The size of the pixels 302 may be selected to provide a desired level of granularity of the signal loss profile relative to the receiver 100. For example, the pixel size may include an azimuthally angle range of not less than about 0.5 degrees to not greater than about 20 degrees and an elevation angle range of not less than about 0.5 degrees to not greater than about 20 degrees. Accordingly, each pixel 302 may be associated with a plurality of sounding signals 112 received at directions of incidence 114 falling within a respective pixel 302. In this regard, the signal loss values for each such sounding signal 112 having a direction of incidence 114 within a pixel 302 may be used to generate a statistical loss value for the pixel 302. As such, each signal loss value for a direction of incidence phone within a pixel may be statistically analyzed to provide a statistically derived signal loss value for a pixel covering a an analytical surface relative to the receiver 100. For instance, a plurality of sounding signals 112 for directions of incidence 114 falling within a pixel 302 may be processed to generate a statistical loss value with respect to each given pixel 302. Additional sounding signals 112 may be processed until a statistically stable loss value is achieved. For example, slight variations within sounding signals 112 received the directions of incidence within a given pixel may be experienced. However, the statistically derived statistical loss value may be a generic characterization of a signal loss value for a given pixel 302 to collectively determine a statistically stable value for a given pixel 302. In this regard, the resulting signal loss profile for the surroundings of the receiver 100 may be generated for each pixel 302 to develop a signal loss profile described relative to the receiver 100 using the statistical loss value for each pixel 302. Examples of statistical loss values generated for a given pixel 302 may include a mean signal loss value and/or a standard deviation of the signal loss values for each respective sounding signal having a direction of incidence within a pixel 302.

FIGS. 6, 7A, and 7B depict an alternative representation of signal loss profiles 600 and 700. FIGS. 7A and 7B show the same signal loss profile at different perspectives. As can be appreciated from the figures, a pronounced band shell effect is present in the signal loss profile 700, thus demonstrating a potential or an asymmetrical or shaped signal loss profile relative to a receiver.

Figure 4:
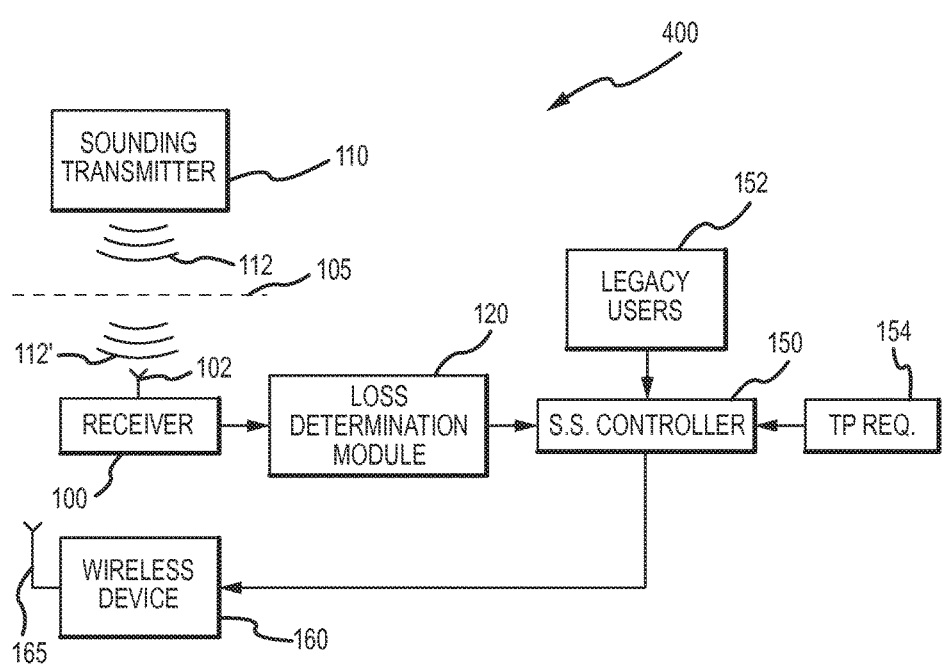
FIG. 4 depicts a schematic view of the system that may be utilized to generate signal loss estimates based on a structure surrounding a receiver for use in provision of shared spectrum resources.

In this regard, the derived signal loss profile for the receiver 100 may be utilized in a number of contexts. One particular context includes utilization of a signal loss profile for a receiver 100 in connection with a shared spectrum system 400 as depicted in FIG. 4. The shared spectrum system 400 may include a receiver 100 that receives a sounding signal 112 from a sounding transmitter 110. The sounding signal 112 may pass through a structure 105 in which the receiver 100 is located and undergo a loss in power. The reduced power sounding signal 112' may be received by the receiver 100 (e.g., at an antenna 102 of the receiver 100). The receiver 100 may provide the received sounding signal 112' to a loss determination module 120. The loss determination module 120 may be locally disposed relative to the receiver 100 or remotely located from the receiver 100. In this latter regard, the loss determination module 120 may be in operative communication with the receiver 100 by way of networked communication. The loss determination module 120 may generate a signal loss profile according to the foregoing discussion.

The signal loss profile for the receiver 100 may in turn be sent to a shared spectrum controller 150 for use in assigning shared spectrum resources for use in wireless communications in the shared spectrum system 400. The shared spectrum resources may be assigned to or approved for a wireless device 160 that may include a transmitter, receiver, and/or transceiver. The wireless device 160 may be collocated with the receiver 100. By collocated, it is meant that the wireless device 160 may be near enough the receiver 160 to reliably attribute the signal loss profile for the receiver 100 to the wireless device 160. Accordingly, in an embodiment, the wireless device 160 may be provided integrally with the receiver 100. Alternatively, the wireless device 160 may be within a predetermined distance of the receiver 100 to reliably attribute the signal loss profile of the receiver 100 to the wireless device 160. This predetermined distance may be dependent upon the signal loss profile (e.g., such as upon characteristics of the signal loss profile), transmission/receiving parameters of the receiver 100 and/or wireless device 160, known information regarding the structure 105 in which the receiver 100 and/or wireless device 160 are located, or other parameters. In still further embodiments, the receiver 100 may be deemed to be collocated with the wireless device 160 if the devices are both members of a common network such as a local area network or the like. As such, collocation between the receiver 100 and the wireless device 160 may not require strict exact positioning between the devices, but are within a predetermined distance such that the signal loss profile of the receiver 100 may be assumed to be accurate for the wireless device 160.

In an embodiment, the loss determination module 120 and/or shared spectrum controller 150 may be operative to extrapolate signal loss values from the signal loss profile of the receiver 100 to projected or anticipated signal loss values for the wireless device 160. For instance, the receiver 100 may receive the sounding signal 120 at a first frequency. The wireless device 160 may transmit and/or receive signals at a second frequency different than the first frequency. As such, the projected signal loss for the wireless device 160 may be extrapolated based on known loss differences relative to the different frequencies. For instance, published signal loss versus frequency relationships may be provided. One such example of such published relationship table is published by the U.S. National Institute of Standards and Technology. In any regard, the signal loss profile may be extrapolated to account for the wireless device 160 operating at a different frequency than that of the sounding signal 112. In an embodiment, the sounding signal 112 may be at a lower frequency than the frequency at which the wireless device 160 operates. For instance, in the example where the sounding signal is a GNSS navigation signal, the signal may be at roughly 1-1.5 GHz. The wireless device 160 may operate at 2.4 GHz or greater. While these examples are provided, it will be understood that other operational frequency ranges of the sounding signal 112 and/or wireless device 160 are contemplated. In another embodiment, despite different frequencies of the sounding signal 112 and the operational frequency of the wireless device 160, the signal loss profile generated based on the sounding signal 112 may be equated to the signal loss profile of the wireless device 160 at the different frequency. That is, any difference in loss due to the difference in frequencies may be ignored in at least some embodiments.

In an embodiment, a number of radio parameters may be assigned to the wireless device 160 at least in part based on a signal loss profile provided by the loss determination module 120. Examples of such radio parameters may include, but are not limited to, carrier frequency, bandwidth, directional antenna configuration, and station transmitting power. Furthermore, these parameters may be dynamically assigned by the shared spectrum controller or may be provided in the form of a request to participate in the shared spectrum system 400 that is in turn approved/disapproved by the shared spectrum controller 150 at least in part based on a signal loss profile. In this regard, the shared spectrum controller 150 may manage the shared spectrum resource at least partially using one or more signal loss profiles as generated herein.

The shared spectrum control 100 may also be in operative communication with data stores 152 and 154. Data store 152 may include information related to legacy services that operate within the shared spectrum system 400. As described above, such legacy services may include licensed spectrum use and/or high priority spectrum uses that may include, but are not limited to broadcasters, radar installations, or other high priority spectrum uses. Data store 154 may include information about third party requests for use of spectrum resources. Some such third party requests may have higher or lower priority for use of spectrum resources than the wireless device 160. In any regard, the shared spectrum controller 150 may manage allocation and/or approval of radio parameters or the wireless device 160 in view of the information regarding legacy services and/or third party requests for use of spectrum resources. Accordingly, the shared spectrum controller 150 may optimize spectrum resources with respect to link performance and/or shared spectrum performance. In this regard, optimization of link performance of the wireless device 160 and/or optimization of shared spectrum performance may include, for example, optimization of power levels, carrier frequencies, bandwidth, directional antenna configurations, or other parameters for one or more users of shared spectrum resources and may be at least in part based on a signal loss profile, legacy services, and/or third party users of the resource.

For instance, while traditional approaches to allocation of spectrum resources may include approximating the transmitter range in free space, such approximation may be overly constraining such that optimization of the resource may not be achieved. However, given a signal loss profile, more refined estimates of signal propagation originating from a wireless device 160 may be achieved. That is, an assumption may be made regarding the effects of the structure 105 on the propagation of a signal from the wireless device 160 based on the effect of the structure 105 on signals used at the collocated receiver 100 to generate the signal loss profile. As described above, in at least some embodiments, such assumptions may be augmented by known relationships between radiofrequency signals of different frequencies.

Furthermore, use of the signal loss profile by the shared spectrum controller 150 may be utilized to provide licenses and/or temporary authorizations of use of spectrum in a given spectrum and/or may be utilized to coordinate use of spectrum between two incumbent authorized users. That is, for example, in licensing TVWS spectrum, use of a signal loss profile as described herein may be utilized for initial licensure and/or authorization for use of spectrum in the TVWS. Additionally or alternatively, a shared spectrum controller may coordinate use of spectrum between two incumbent license holders based on the signal loss profiles. In this latter regard, two incumbent license holders may be able to maximize use of a given spectrum license by coordinating (e.g., by the shared spectrum controller 150) with other incumbent license holders for maximization of spectrum resources. Thus, the shared spectrum controller 150 may be operated by a licensing entity or another party that is not capable of licensing spectrum use but is capable of directing licensed use for increasing efficiency of spectrum use.

In any regard, the signal loss profile for a given receiver 100 that may be determined according to the foregoing description may be provided for use in assigning shared spectrum parameters to a wireless device 160. Thus, rather than using free space estimation of radio propagation, the radio propagation of signals from the wireless device 160 may be modeled using the signal loss profile. The use of a signal loss profile in conjunction with management of a shared spectrum system 400 is illustrated in FIG. 5. FIG. 5 depicts a top view of a representation of a first location 510 and a second location 520 that both utilize a shared spectrum resource (e.g., managed by a shared spectrum controller 150). The first location 510 may correspond to a wireless device 160 and collocated receiver 100 requesting participation a shared spectrum system 400. The free space estimate of the signal propagation from the first location 510 (e.g., the free space estimate of signal propagation from the wireless device 160) may be represented by the circle 512 surrounding the first location 510. That is, using free space estimation signal propagation from an omnidirectional antenna at the first location 510, it may be estimated that the signal propagation may extend to an estimated free space boundary represented by line 512. The second location 520 may comprise a legacy system or higher priority resource such that interference within a protection boundary 522 is not permitted. As may be appreciated, the free space estimation 512 of the radio propagation at the first location 510 may cross the protection boundary 522. In turn, in traditional approaches the first location 510 may be disallowed from utilizing the shared spectrum resources due to the potential of interference using the free space estimation 512 relative to the protection boundary 522.

However, a signal loss profile for the first location 510 may be developed. Accordingly, the actual propagation of a signal as affected by the structure at the first location 510 may be represented by the attenuated propagation pattern 514. That is, the attenuated propagation patter 514 may represent an adjusted propagation pattern from the first location 510 based on the signal loss profile generated at the first location 510. The attenuated propagation 514 from the first location 510 may not cross the protection boundary 522. In this regard, allocation of shared spectrum resources to the first location 510 may be allowed at least partially based upon the attenuated propagation pattern 514 determined utilizing the signal loss profile generated for the first location 510.

Such use of a signal loss profile may provide significant and important benefits when allocating shared spectrum resources. For instance, it has been estimated that small cell stations participating in a shared spectrum system are likely to be installed indoors in over 90% of applications. Moreover, building isolation may contribute 10-40 dB of power reduction in a signal passing through a building. This represents a 10-10,000 times reduction in power. In the event these losses are not considered, many, if not most, small cell stations will be underutilized based on a free space estimate of signal propagation relative thereto. As such, utilization of a signal loss profile as described herein may have an important and drastic improvement on the utilization of a shared spectrum resource.

The use of a signal loss profile may also be beneficial number of other context. For example, any application whereby a correlation may be made between a building property and signal attenuation by the building may benefit from the generation of a signal loss profile. One contemplated application includes building integrity monitoring. In this application, signal loss profiles generated by a receiver that is stationary within a building may be observed over time to determine changes in building properties that are reflected in changes in the signal loss profile over time. Furthermore, a correlation between radiofrequency signal loss and infrared energy may allow for evaluation of energy efficiency studies relative to the building. That is, a signal loss profile related to radiofrequency signal loss in a building may provide valuable information regarding impinging infrared or heat energy relative to a building. Any other application where a correlation between radiofrequency signal loss in a building parameter may be made may benefit from use of a signal loss profile as described herein.

The generation of the signal loss profile at a given location may not only account for signal loss by way of signal loss due to attenuation by a surrounding structure, but may also account for signal loss due to multipath losses as a sounding signals are reflected and/or refracted prior to arriving at a receiver 100. Multipath losses may be significant and also maybe experienced by outbound signals emanating from a structure (e.g., as transmitted by a wireless device 160 collocated with a receiver 100). In any regard, signal characteristics of the received sounding signal may provide insight as to whether the signal was subjected to any multipath losses. For example, the phase, polarization, and/or other characteristic of the received sounding signal may be analyzed to determine whether a direct path or multipath losses was experienced by the signal. In any regard, losses imparted in the form of multipath losses may be reflected by a signal loss profile generated for a given receiver 100.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for determining a signal power loss relative to a receiver, the method comprising:
   obtaining measured received power levels for each of a plurality of sounding signals from one or more sounding transmitters as measured at a stationary receiver located within a structure, wherein the one or more sounding transmitter is at a known location relative to the receiver upon transmission of a sounding signal and the plurality of sounding signals pass through at least a portion of the structure;

determining a direction of incidence relative to the receiver based at least in part on the known location of the sounding transmitter relative to the receiver for each of the plurality of sounding signals received at the receiver;

calculating a signal loss value for each of the plurality of sounding signals based at least in part on the measured receiver power level of each of the plurality of sounding signals and a corresponding known signal power level relative to the receiver in free space;

generating a signal loss profile for the receiver based at least on the signal loss values and the corresponding direction of incidence of each of the plurality of sounding signals relative to the receiver; and extrapolating the signal loss values calculated for the plurality of sounding signals broadcast at a sounding frequency to determine a projected signal loss for a transmission frequency of a transmitter collocated with the receiver based on known loss relationships between the sounding frequency and the transmission frequency, wherein the transmitter utilizes a transmission frequency different than the sounding frequency of the plurality of sounding signals.

2. The method of claim 1, wherein at least two of the plurality of sounding signals have a different direction of incidence relative to the receiver.

3. The method of claim 1, wherein the signal loss profile includes at least a two dimensional representation of signal loss values at corresponding directions of incidence relative to the receiver.

4. The method of claim 1, wherein the signal loss profile comprises a plurality of pixels having an area defined relative to the receiver, wherein each pixel has an associated statistical signal loss value corresponding to the signal loss values that are associated with the direction of incidences within the pixel.

5. The method of claim 4, wherein the statistical signal loss value for a given pixel comprises a statistically derived measure based on at least one sounding signal received at a direction of incidence within the pixel.

6. The method of claim 5, wherein the statistically derived measure comprises a mean signal loss value of each signal loss values with a direction of incidence within the pixel.

7. The method of claim 6, wherein the statistically derived measure comprises a standard deviation for the plurality of signal loss values derived with directions of incidence within the pixel.

8. The method of claim 4, wherein each pixel is defined by a range of azimuth angles and a range of elevation angles relative to the receiver, wherein each pixel comprises a range of azimuth angles of at least about 0.5 degrees and not greater than about 20 degrees and a range of elevation angles of at least about 0.5 degrees and not greater than about 20 degrees.

9. The method of claim 1, wherein the signal loss value comprises a carrier to thermal noise power ratio.

10. The method of claim 1, wherein the sounding transmitter comprises a GNSS space vehicle and the sounding signal comprises a navigational signal broadcast by the GNSS space vehicle, wherein the navigational signals include ephemeris data regarding the GNSS space vehicle and the known location of the sounding transmitter relative to the receiver is determined based on the ephemeris data.

11. The method of claim 10, further comprising locating the receiver using the navigational signal.

12. The method of claim 1, wherein the direction of incidence comprises an elevation angle and an azimuth angle defining a direction extending between the sounding transmitter and the receiver.

13. The method of claim 1, further comprising:
determining if the sounding signal is a direct wave from the sounding transmitter or a multipath wave from the sounding transmitter at least in part based on an analysis of the sounding signal characteristics at the receiver.

14. The method of claim 1, wherein the sounding signals are received at the receiver using a time spread approach to signal acquisition to acquire a plurality of sounding signals over a defined period, wherein the defined period comprises a plurality of coherent or non-coherent integration intervals.

15. The method claim 14, wherein the defined period is at least greater than one hour.

16. The method of claim 1, wherein the sounding frequency of the sounding signals is less than the transmission frequency of the transmission frequency of the collocated transmitter.

17. The method of claim 16, wherein the signal loss value calculated for the sounding signal is equated to the projected signal loss for the transmission frequency of the transmitter.

18. The method of claim 1, further comprising:
sending the signal loss value and the associated direction of incidence to a shared spectrum controller.

19. The method of claim 18, further comprising:
receiving, from the shared spectrum controller, an assignment of one or more transmission parameters for use in connection with a transmitter collocated with the receiver in a shared spectrum regime is wherein the assignment at least in part based on the signal loss value and the associated direction of incidence.

20. The method of claim 1, wherein the plurality of sounding transmitters comprise at least a first sounding transmitter corresponding to a first satellite vehicle type and at least a second sounding transmitter corresponding to a second satellite vehicle type, wherein signal reception coverage of the first sounding transmitter is different than the signal reception coverage of the second sounding transmitter relative to the receiver.

21. The method of claim 20, wherein the first satellite vehicle type is a navigational satellite and the second satellite vehicle type is a communications satellite.

22. A system for determining a signal power loss relative to a receiver disposed within a structure, the system comprising:

a stationary receiver disposed within a structure that is operable to receive a plurality of sounding signals at a measured received power level, each of the plurality of sounding signals having a direction of incidence relative to the receiver from one or more sounding transmitter at a known location relative to the receiver, wherein the sounding signal passes through at least a portion of the structure, and wherein the direction of incidence is determined at least in part on the known location of the sounding transmitter relative to the receiver upon transmission of a sounding signal;

a loss determination module, executed by a processor in operative communication with the receiver, that is operative to:

calculate a signal loss value for each of the plurality of sounding signals based on the measured received power level and a known signal power level of the sounding signal relative to the receiver in free space, generate a signal loss profile for the receiver based at least in part on the signal loss value and the corresponding direction of incidence of each of the plurality of sounding signals relative to the receiver, and extrapolate the signal loss value calculated for each of the sounding signals at a sounding frequency to determine a projected signal loss for a transmission frequency of a transmitter collocated with the receiver based on known loss relationships between the sounding frequency and the transmission frequency.

23. The system of claim 22, wherein at least two of the plurality of sounding signals have a different direction of incidence relative to the receiver.

24. The system of claim 22, wherein the signal loss profile includes at least a two dimensional representation of signal loss values at corresponding directions of incidence relative to the receiver.

25. The system of claim 22, wherein the signal loss profile comprises a plurality of pixels having an area defined relative to the receiver, wherein each pixel has an associated statistical signal loss value corresponding to the signal loss values that are associated with the direction of incidences within the pixel.

26. The system of claim 25, wherein the statistical signal loss value for a given pixel comprises a statistically derived measure based on at least one sounding signal received at a direction of incidence within the pixel.

27. The system of claim 25, wherein each pixel is defined by a range of azimuth angles and a range of elevation angles relative to the receiver, wherein each pixel comprises a range of azimuth angles of at least about 0.5 degrees and not greater than about 20 degrees and a range of elevation angles of at least about 0.5 degrees and not greater than about 20 degrees.

28. The system of claim 22, wherein the signal loss value comprises a carrier to thermal noise power ratio.

29. The system of claim 22, wherein the sounding transmitter comprises a GNSS space vehicle and the sounding signal comprises a navigational signal broadcast by the GNSS space vehicle, wherein the navigational signals include ephemeris data regarding the GNSS space vehicle and the known location of the sounding transmitter relative to the receiver is determined based on the ephemeris data.

30. The system of claim 29, wherein the loss determination module is operative to locate the receiver using the navigational signal.

31. The system of claim 22, wherein the sounding frequency of the sounding signal is less than the transmission frequency of the transmission frequency of the collocated transmitter.

32. The system of claim 31, wherein the signal loss value calculated for the sounding signal is equated to the projected signal loss for the transmission frequency of the transmitter.

33. The system of claim 22, wherein the loss determination module is operative to send the signal loss value and the associated direction of incidence to a shared spectrum controller.

34. The system of claim 33, further comprising:
a transmitter collocated with the receiver that receives, from the shared spectrum controller, an assignment of one or more transmission parameters for use in connection with the transmitter collocated with the receiver in a shared spectrum regime is wherein the assignment at least in part based on the signal loss value and the associated direction of incidence.

* * * * *